(12) United States Patent
Heliot et al.

(10) Patent No.: US 8,154,950 B2
(45) Date of Patent: Apr. 10, 2012

(54) METHOD FOR DISPLAYING GEOLOGIC STRESS INFORMATION AND ITS APPLICATION TO GEOLOGIC INTERPRETATION

(75) Inventors: Denis Heliot, Sugar Land, TX (US); Yan Gongrui, Beijing (CN); Jean Desroches, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 664 days.

(21) Appl. No.: 12/335,064

(22) Filed: Dec. 15, 2008

(65) Prior Publication Data

US 2010/0149918 A1    Jun. 17, 2010

(51) Int. Cl.
*G01V 1/00* (2006.01)
(52) U.S. Cl. ............................................. 367/68; 367/72
(58) Field of Classification Search ............... 367/68, 367/72
See application file for complete search history.

(56) References Cited

U.S. PATENT DOCUMENTS

| | | | | |
|---|---|---|---|---|
| 5,675,088 A | * | 10/1997 | Serata | 73/784 |
| 6,885,944 B2 | * | 4/2005 | Davidson | 702/14 |
| 7,123,269 B1 | * | 10/2006 | Bourdey et al. | 345/589 |
| 7,769,546 B2 | * | 8/2010 | Lomask et al. | 702/14 |
| 2003/0214537 A1 | * | 11/2003 | Lynn | 345/835 |
| 2005/0057559 A1 | * | 3/2005 | Komarechka | 345/418 |
| 2006/0256010 A1 | * | 11/2006 | Tanygin et al. | 342/443 |
| 2007/0185694 A1 | * | 8/2007 | Rousselier et al. | 703/2 |
| 2008/0249721 A1 | * | 10/2008 | Zoback et al. | 702/42 |
| 2009/0079745 A1 | * | 3/2009 | Fun | 345/474 |
| 2010/0149918 A1 | | 6/2010 | Heliot et al. | |

OTHER PUBLICATIONS

Heidbach et al., The 2008 Release of the World Stress Map, Heidelberg Academy of Sciences and Humanities, http://www.world-stress-map.org.
"In Situ Stress Testing using MDT in Western Canada," http://www.slb.com/content/about/events/200804_ofs_Canada_presentations.asp#1000.

* cited by examiner

*Primary Examiner* — Mark Hellner
(74) *Attorney, Agent, or Firm* — Darla P. Fonseca; Jody Lynn DeStefanis; Charlotte Rutherford

(57) ABSTRACT

A method for displaying geologic stress includes determining magnitudes and directions of principal stresses at at least one a selected location. An analog symbol is generated for each magnitude and direction of the principal stresses. The analog symbols include a magnitude descriptor and a direction descriptor. The analog symbols are stored or displayed.

7 Claims, 3 Drawing Sheets

METHOD FOR DISPLAYING GEOLOGIC STRESS INFORMATION AND ITS APPLICATION TO GEOLOGIC INTERPRETATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of determining and displaying geologic stress information. More particularly, the invention relates to display and interpretation techniques for geologic stress information.

2. Background Art

Forces acting in specific directions ("stresses") on subsurface rock formations are important to determine in planning subsurface geologic operations such as mining and wellbore drilling, for example. Knowledge of the stresses may enable planning the geologic operations to avoid undesirable events, for example, wellbore and/or wellbore casing collapse, formation blowout, loss of drilling or cementing fluid and production into a wellbore of formation solids.

In determining the stresses acting on any particular formation at a particular depth in the subsurface, in most cases it can reasonably assumed that the vertical stress is a principal stress, meaning that no shear stress exists in the plane perpendicular to the direction of Earth's gravity, and that the maximum and minimum horizontal stresses are orthogonal to each other. The foregoing assumptions enable description of the total in situ stress tensor with four values: Sv (vertical stress); SH (maximum horizontal stress); Sh (minimum horizontal stress); and SH azimuth (geodetic direction of the maximum horizontal stress); For other cases where Sv is not a principal stress, the total in situ stress tensor can be described by six values: Sv' (the principal stress that is closest to the vertical direction); SH' (the larger of the other two principal stresses); Sh' (the remaining principal stress); Sv' deviation (represented by DEV and which is the geodetic direction of Sv' from vertical); Sv' azimuth (represented by AZI and which is the geodetic direction of Sv'); and SH' azimuth [AZIH] which is the geodetic direction of SH').

An important characteristic of geologic stress is believed to be the relative magnitudes of the three principal stress components (Sv, SH and Sh, or Sv', SH' and Sh'). Relative magnitudes of the three principal stresses are related to the stress regime and to the type of rock failure induced by the stresses, for example, faults at the geologic structure scale and fracture type at the rock formation layer scale. In determining the likely failure mode of rock formations, it is believed that the relative magnitude of each principal stress component is more important than the absolute values, which vary mostly as a function of depth. The orientation of the stress (SH azimuth, or Sv' deviation, azimuth and SH' azimuth) and the fluid pressure in the pore spaces of porous subsurface formations ("pore pressure") (Pp) are also important to predict the type of failure to expect in subsurface rock formations.

Because it is believed that the relative magnitudes of the principal stresses is more important than their absolute values, it is desirable to have a display and interpretation technique that takes advantage of the foregoing belief to enable better interpretation of stress information.

SUMMARY OF THE INVENTION

A method for displaying geologic stress includes determining magnitudes and directions of principal stresses at at least one a selected location. An analog symbol is generated for each magnitude and direction of the principal stresses. The analog symbols include a magnitude descriptor and a direction descriptor. The analog symbols are stored or displayed.

Other aspects and advantages of the invention will be apparent from the following description and the appended claims

DETAILED DESCRIPTION

Figure 1:
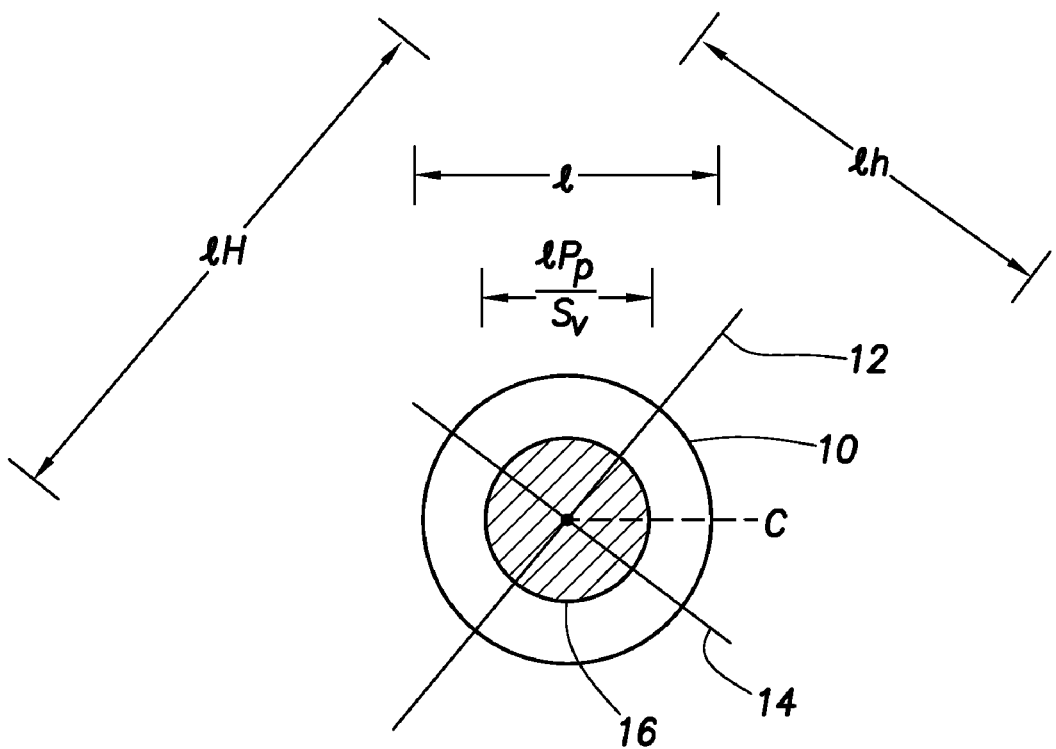
FIG. 1 shows an example stress symbol representing the case wherein Sv is a principal stress

In order to display the stresses present in a rock formation at a particular geodetic location and depth, it is necessary to determine the stresses. Stress information may be obtained from a number of different sources. As explained in the Background section herein, the vertical stress is, in most cases, a principal stress and is typically parallel to the Earth's gravity. Vertical stress may be determined, for example, by calculating a weight of rock formation existing above the depth at which the stress is to be determined and displayed. One technique for estimating the weight of rock formation is to measure the density of the rock from within a wellbore drilled through the rock formations, and to integrate the density measurements from the surface to the depth at which the stress is to be determined and displayed. Devices are known in the art for measuring formation density from within a wellbore drilled through the formations, and can be disposed, for example, at the end of an armored electrical cable ("wireline") or on a drilling tool string used to drill or service the wellbore ("LWD").

Horizontal stresses may be determined by a number of different methods. The most common techniques include pumping fluid into subsurface formations to determine the pressure at which rock strain becomes substantial. Such techniques include "leak off tests" in which fluid pressure is measured while pumping a measured volume of fluid into a formation. The volume at which pressure ceases to increase linearly with respect to fluid volume pumped is typically related to the horizontal stress on the rock formations (although it may be related to vertical stress in relatively shallow formations). One advantageous method is to measure fluid pressure required to open, propagate and to enable closure of a hydraulically induced fracture in a substantially impermeable formation. See for example, an internet page provided by an affiliate of the assignee of the present invention at the URL http://www.slb.com/content/about/events/200804_ofs_canada_presentations.asp#1000, entitled, *In Situ Stress Testing using the MDT in Western Canada*. The method may be characterized as follows. Using a wireline or drill pipe conveyed packer system, a stress test can be performed to measure rock in situ minimum stress and other stress related properties. The stress test is performed by injecting borehole or other fluids between two inflatable packers to initiate and grow a fracture. By monitoring the initiation, propagation, closure and reopening of the induced fracture, in situ stress can be directly observed in real time at the Earth's surface. A fracture that grows perpendicularly to the direction of the minimum stress and extends to four times the wellbore radius (typically the size of the drill bit used to drill the well) will determine the far field (away from the wellbore) stress.

The above examples of determining the stresses present in a particular geodetic position and depth are not intended to limit the scope or manner in which stress may be determined and used in accordance with the invention.

In methods according to the invention, stress magnitude, and where applicable, stress direction may be displayed using analog symbols corresponding to the magnitude and/or direction of the represented stress. In some examples, and referring to FIG. 1, wherein Sv is a principal stress, stress may be visually displayed, such as on a printed graph or map, or on a computer video display as follows. Sv may be represented as a circle 10 of a selected radius l and the length of l may be fixed or related to the magnitude of Sv. SH and Sh may be represented as two perpendicular, intersecting lines 12 and 14, respectively, each symmetrically disposed about the center C of the circle 10 used to represent Sv. The length lH of the line 12 representing SH may be related to the magnitude of SH, such that lH/l may be the ratio of maximum horizontal stress with respect to vertical stress (SH/Sv). The length lh of the line 14 representing Sh may be related to the magnitude of Sh such that lh/l may be the ratio of minimum horizontal stress with respect to vertical stress (represented by Sh/Sv). Fluid pressure in the rock pore spaces (Pp) may be represented as a filled, colored disk 16 of diameter related to the ratio of fluid pressure with respect to vertical stress (Pp/Sv), such disk being located essentially concentrically, with center at C, with the Sv circle. The color may be selected to represent the type of fluid present in the pore spaces of the rock formation, for example, grey used to represent unknown fluid, blue to represent water, green to represent oil, red to represent natural gas, etc. A direction of the line 12 representing SH may be selected to correspond to the geodetic direction of the maximum horizontal stress, SH. In some examples, the geodetic direction may correspond to the display frame such that geodetic North is pointing straight up in the display frame. Thus, the angle with respect to straight up subtended by the line 12 representing SH may correspond directly to the geodetic direction (azimuth) of SH. The line 14 representing Sh will typically be orthogonal to the line 12 representing SH in the plane of the display frame.

Figure 2:
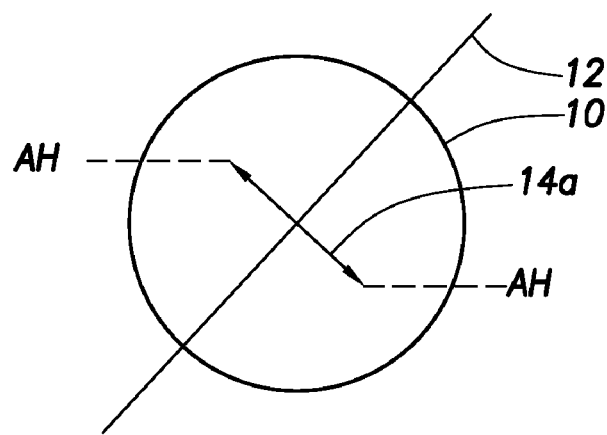
FIG. 2 shows another example stress symbol representing tensile stress.

In many instances, all the stresses represented in the display will be compressional. In some cases, however, one of the stresses, such as the minimum horizontal stress may be tensional. To represent tensional stress, which is equivalent to negative compressional stress, the dimension of the analog symbol (e.g., length of the line for Sh) may be proportional to the stress magnitude. As shown in FIG. 2 at 14A, for such cases the example representation in FIG. 1 may be modified, for example, so that tensional stress may be represented by including symbols such as arrowheads AH at the end of the line 14A.

Figure 3:
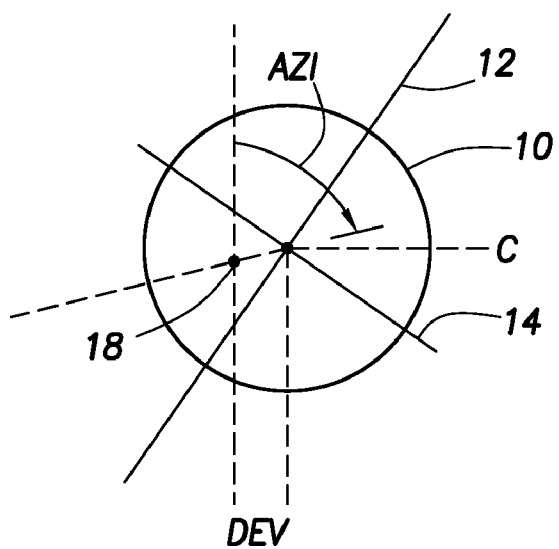
FIG. 3 shows another example stress symbol wherein no principal stress is vertical.

Referring to FIG. 3, the vertical stress will in most cases be a principal stress. It has been observed, however, that in some cases, no principal stress direction is vertical, depending on the geologic structure being analyzed. In such cases, the representation of stress shown in FIG. 1 may be modified to indicate deviation of the principal stress direction from vertical. For example, the magnitudes of three principal stresses Sv', SH' and Sh' may be represented by circle 10, line 12 and line 14, and azimuth of SH' (AZIH) by direction of line 12 (this is similar to FIG. 1). Stress Sv' deviation (DEV) may be represented by a point 18 that is deviated from the center C of the Sv' circle 10 by an amount DEV corresponding to the angular displacement of the stress direction from vertical One example of scaling for DEV is to have the circle 10 represent a polar coordinate plot, wherein the center C represents zero angular displacement and the circumference of the circle 10 represents ninety degrees angular displacement. Geodetic direction of the Sv' (AZI) may be represented by an angular displacement AZI of a line connecting the principal stress direction point 18 and the center C of the circle 10. Although not shown in FIG. 3 for clarity of the illustration, similar symbols as those described previously may be provided to represent the fluid pressure in the rock pore space (pore pressure Pp)

Figure 4:
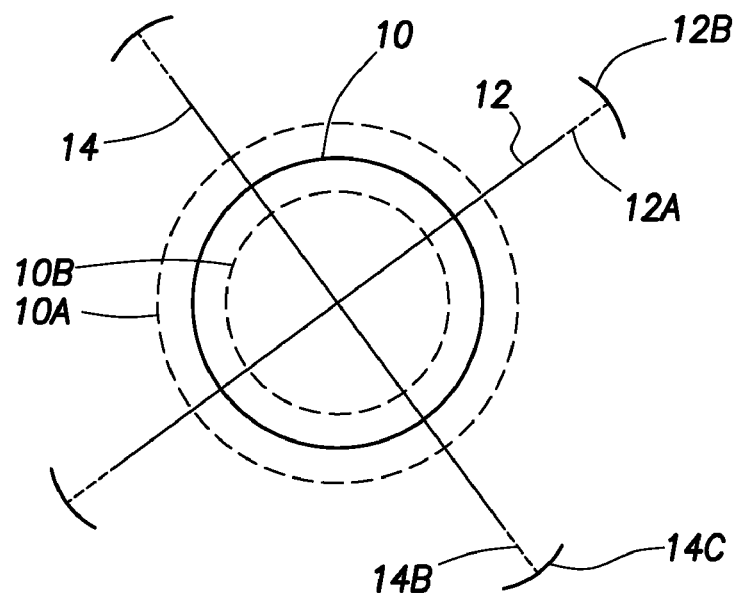
FIG. 4 shows example uncertainty representers usable with stress symbols.

Magnitude and geodetic direction of the stress values may only be determinable to a particular degree of confidence. Such determination may include a range of uncertainty. Referring to FIG. 4, the display of FIG. 1 may be modified to include a display related to the uncertainty. For example, the range of uncertainty of the vertical stress may be represented by a maximum expected value and a minimum expected value, represented by dashed circles 10A and 10B. Uncertainty in the value of horizontal stress may be indicated by dashed line ends 12A and 14B, respectively, appended to the horizontal stress symbols 12, 14. The dashed line ends 12A and 14B may have length corresponding to the uncertainty range, and may be appended to the ends of the corresponding lines 12, 14 where the lines 12, 14 have length related to the expected minimum value of each respective horizontal stress. Uncertainty as to the geodetic direction of the horizontal stress may be represented by arcuate segments 12B 14C appended to the ends of each horizontal stress symbol (lines 12 and 14). Although not shown in FIG. 4 for clarity of the illustration, similar symbols may be provided for uncertainty in the value of the fluid pressure in the rock pore space (pore pressure). For the cases wherein a principal stress is not vertical, similar symbols may be provided for the uncertainty of Sv', SH' and Sh'.

Figure 5:
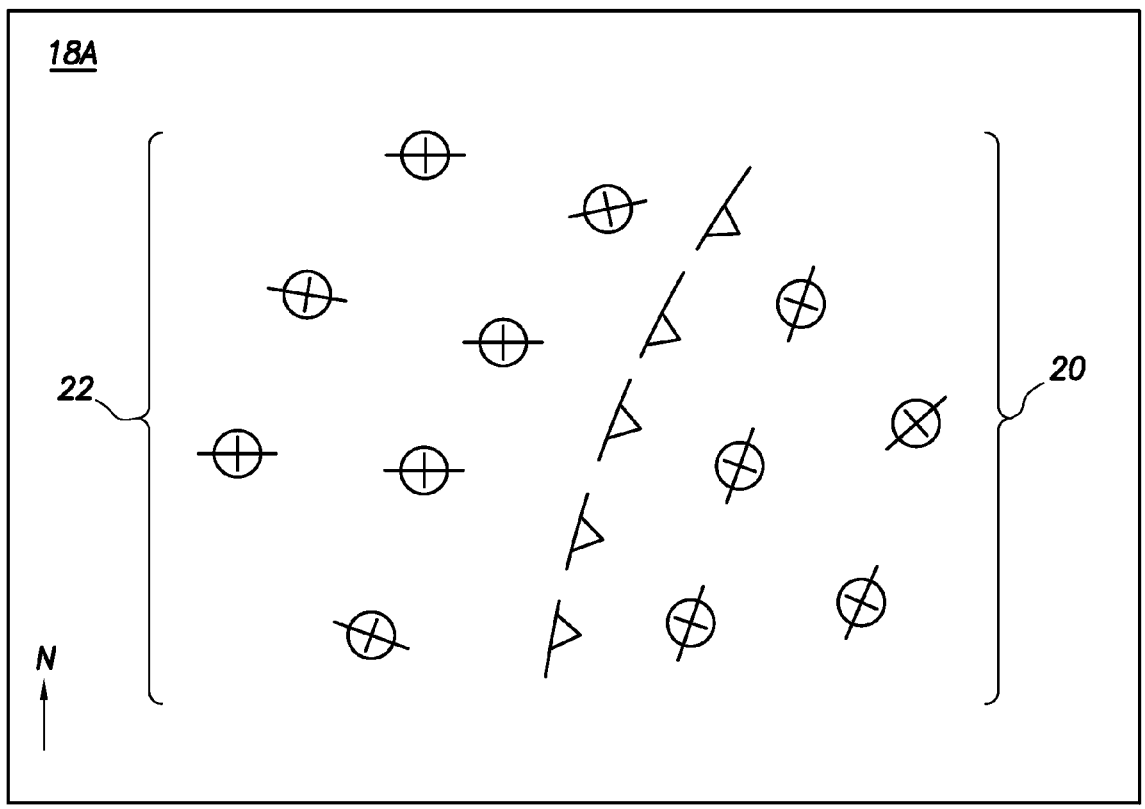
FIG. 5 shows an example map display of stress symbols and interpretation of an example geologic feature using the symbols.

Displaying stress as described herein on one or more types of geologic presentations may provide the capability to identify subsurface geologic phenomena of interest. FIG. 5 shows an example of such a display and a possible interpretation. In FIG. 5, stress symbols substantially as explained above may be presented on a two dimensional map 18A. The map 18A may correspond to one or more depths or geologically corresponding features in the subsurface. Stress symbols 20, 22, substantially as explained above may be located, for example, such that their circle centers are disposed on the map 18A at positions corresponding to the geodetic positions of wellbores drilled through rock formations in the area defined by the map 18A. For symbols that represent stress in the subsurface, and in the case where the wellbores have trajectories other than substantially vertical, the symbol position corresponding to each well should be positioned at the geodetic position of such well at the represented depth or geologic feature definable by depth. In the present example, the symbols appear to define two different stress fields. One of the stress fields, shown by the symbols at 20, may be characterized as having maximum horizontal stress in a direction approximately geodetic North. Another stress field, shown by the symbols at 22 may be characterized as having maximum horizontal stress direction being approximately geodetic East. A possible interpretation of such change in stress fields may be a geologic fault, shown at 24. It is believed that display of stress symbols as described with reference to FIGS. 1 through 4 in map form such as shown in FIG. 5 may assist in determining the presence of such geologic features as, for example, faults, unconformities, transgression and regression series. Such features may not be apparent with conventional numerical representation of stress magnitudes and directions. The map shown in FIG. 5 may be replicated for stresses present at various selected depths or for various correlative stratigraphic features in the subsurface, for example, a specific composition of rock formation, specific porosity zone, specific natural radioactivity marker, etc. The map shown in FIG. 5 is only one example of map format that can be used with the display of the present invention. Other maps may include stress values obtained without reference to wellbores. One example is a stress map of a number of geodetic locations on the Earth authored by, Heidbach, O., Tingay, M., Barth, A., Reinecker, J., Kurfeβ, D., and Müller, B. (2008): *The 2008 release of the World Stress Map* (available online at http://www.world-stress-map.org). Other maps may display stress symbols at regularized positions in a map display frame, rather than at positions corresponding to geodetic locations of wellbores.

Figure 6:
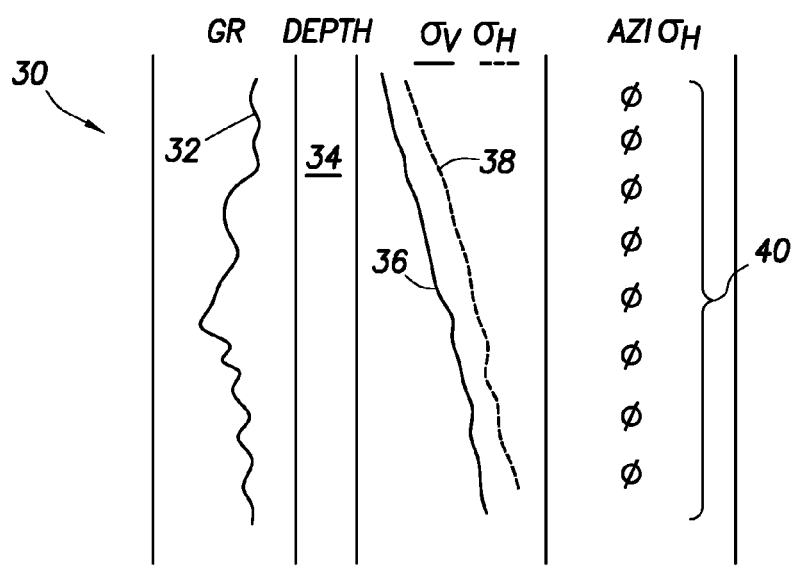
FIG. 6 shows an example well log display including stress symbols.

In addition to the map type presentation of stress symbols explained above, it is also possible to present stress symbols in "well log" format. Referring to FIG. 6, a well log as that term is known in the art is a record indexed with respect to depth (usually "measured depth" or the axial length of a wellbore, but which also may be true vertical depth or other reference index) of measurements made by various instruments. The instrument measurements may be displayed in scaled curve format, wherein the scales are defined in "tracks" each occupying a selected portion of the width of the well log display. The well log 30 in FIG. 5 may include a rock composition measurement, such as natural gamma radiation shown at curve 32. The log 30 may also include curves representative of the magnitude of the vertical stress at 36 and the maximum horizontal stress at 38. Other curves representative of other measurements and stresses (e.g., pore pressure and minimum horizontal stress) may be presented in other examples of a well log and the example shown in FIG. 6 should in no way be construed as limiting the scope of well log displays within the scope of the present invention. In a right hand most "track" in the well log, stress symbols 40 may be presented indexed with respect to depth at which the stress determinations are made. The symbols may include any or all of the stress tensor elements described above with reference to FIGS. 1 through 4.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for displaying geologic stress, comprising:
   determining magnitudes and directions of principal stress components at least one selected location;
   generating an analog symbol for each magnitude and direction of each principal stress component, each analog symbol including a magnitude descriptor and a direction descriptor, wherein the magnitude descriptor of one of the principal stress components comprises a planar geometric shape and the direction descriptor of that principal stress component is perpendicular to the plane of the geometric shape; and displaying the analog symbols further comprising an uncertainty descriptor for at least one of the magnitude descriptors and the direction descriptors.

2. The method of claim 1 wherein the magnitude descriptor of at least one of the other principal stress components comprises a line having a length corresponding to the magnitude of that principal stress component.

3. The method of claim 2 wherein a direction of the line in a display field corresponds to a geodetic direction of the stress represented by the line.

4. The method of claim 1 wherein the geometric shape is a circle having a diameter corresponding to the magnitude of that principal stress component.

5. The method of claim 1 wherein the uncertainty descriptor comprises geometrical shapes having dimensions corresponding to a minimum and a maximum stress magnitude.

6. The method of claim 1 wherein the uncertainty descriptor for the directional descriptor comprises arcuate segments at the end of a line representing the magnitude descriptor.

7. The method of claim 1 wherein the uncertainty descriptor for the magnitude descriptor comprises line segments at the end of a line representing the magnitude descriptor.

\* \* \* \* \*